United States Patent [19]

Habert

[11] 4,112,895
[45] Sep. 12, 1978

[54] ELECTRONIC DISTRIBUTION AND CONTROL DEVICE FOR THE IGNITION OF INTERNAL COMBUSTION ENGINES, PARTICULARLY FOR MOTOR VEHICLES

[75] Inventor: Roger Habert, Epinay, sur Seine, France

[73] Assignee: Ducellier et Cie, Paris, France

[21] Appl. No.: 654,946

[22] Filed: Feb. 3, 1976

Related U.S. Application Data

[63] Continuation-in-part of Ser. No. 466,484, May 2, 1974, abandoned.

[30] Foreign Application Priority Data

May 10, 1973 [FR] France .................. 73.16946

[51] Int. Cl.² .................................................. F02P 5/04
[52] U.S. Cl. ........................ 123/117 R; 123/146.5 A
[58] Field of Search ........... 123/117 R, 148 E, 117 D, 123/146.5 A

[56] References Cited

U.S. PATENT DOCUMENTS

| | | | |
|---|---|---|---|
| 3,454,871 | 7/1969 | Nolting | 123/117 D |
| 3,671,805 | 6/1972 | Schuette | 173/148 E |
| 3,696,303 | 10/1972 | Hartig | 123/148 E |
| 3,738,339 | 6/1973 | Huntzinger et al. | 123/117 D |
| 3,749,073 | 7/1973 | Asplund | 123/117 D |
| 3,757,755 | 9/1973 | Carner | 123/117 D |
| 3,809,029 | 5/1974 | Wakamatsu et al. | 123/117 R |
| 3,853,103 | 12/1974 | Wahl et al. | 123/117 D |
| 3,855,973 | 12/1974 | Scofield | 123/146.5 A |
| 3,890,944 | 6/1975 | Werner. et al. | 123/148 E X |
| 3,896,776 | 7/1975 | Ford | 123/146.5 A |
| 3,903,857 | 9/1975 | Honig et al. | 123/117 D |

*Primary Examiner*—Charles J. Myhre
*Assistant Examiner*—Tony M. Argenbright

[57] ABSTRACT

An electronic distribution and control device for the ignition of internal combustion engines, particularly for motor vehicles, having a computer with which is combined an ignition advance system the said computer processing signals supplied by detectors of limit positions between which the ignition must occur as a function of the speed of rotation of the engine, and by at least one sensor of one of the operational parameters of the engine, which signals are then amplified and fed to voltage step-up coils to produce an ignition spark between the electrodes of at least one sparking plug.

4 Claims, 10 Drawing Figures

ELECTRONIC DISTRIBUTION AND CONTROL DEVICE FOR THE IGNITION OF INTERNAL COMBUSTION ENGINES, PARTICULARLY FOR MOTOR VEHICLES

This application is a continuation-in-part of my application Ser. No. 466,484 filed May 2, 1974, now abandoned.

The present invention relates to an electronic ignition distribution and control device for an internal combustion engine, and is intended for motor vehicles.

Mechanical ignition devices are already known, without distribution elements, which, in the case of a four cylinder engine, includes two contact breakers contolled by a double cam, each cam having two lobes at 180° one to the other and the two cams being relatively offset by 90°. In these known devices, each contact breaker is connected to a voltage step-up coil having two high voltage outputs, each output being connected to a sparking plug, the ignition advance being controlled by a regulator of the centrifugal type and/or by a regulator actuated by the depression prevailing in the inlet manifold of the internal combustion engine.

Electronic devices are also known which use a mechanical, optical, magnetic, fluid, oscillating etc., control element, the distribution being carried out by a rotating mechanical device of a well-known type.

It will be understood that in such devices, the clearances necessary for good operation introduce a factor of inaccuracy, and the devices are also subject to the vibrations of the engine; this results in wear of the elements, such wear being inherent in this type of device.

An object of the present invention is to provide an electronic distribution and control device in which the aforementioned disadvantages are minimised or avoided.

According to the invention an electronic ignition control and distribution device for an internal combustion engine comprises the combination of detector means including a part rotatable by the engine and directly detecting limiting positions between which ignition must take place for each cylinder of the engine, said detector means generating first and second output signals at said limit position, a computer including an ignition advance system connected to said detector means to trigger said ignition advance system into operation when said first output signal is produced, said ignition advance system including delay determining means sensitive to at least one engine operating parameter to determine the delay between triggering of said advance system and the production of a spark producing output signal thereby, said advance system also including means for producing a spark producing signal independently of said delay determining means when said second output signal occurs before the termination of said delay, at least one amplifier connected to said computer for amplifying said spark producing signal, a voltage step-up coil having a primary connected to said amplifier and a secondary connected to at least one spark plug, whereby a spark is produced at said spark plug either after a delay determined by said at least one engine operating parameter following production of said first output signal, or on production of said second output signal, whichever occurs first.

The invention will now be described, by way of example, with reference to the accompanying drawings in which.

Figure 3:
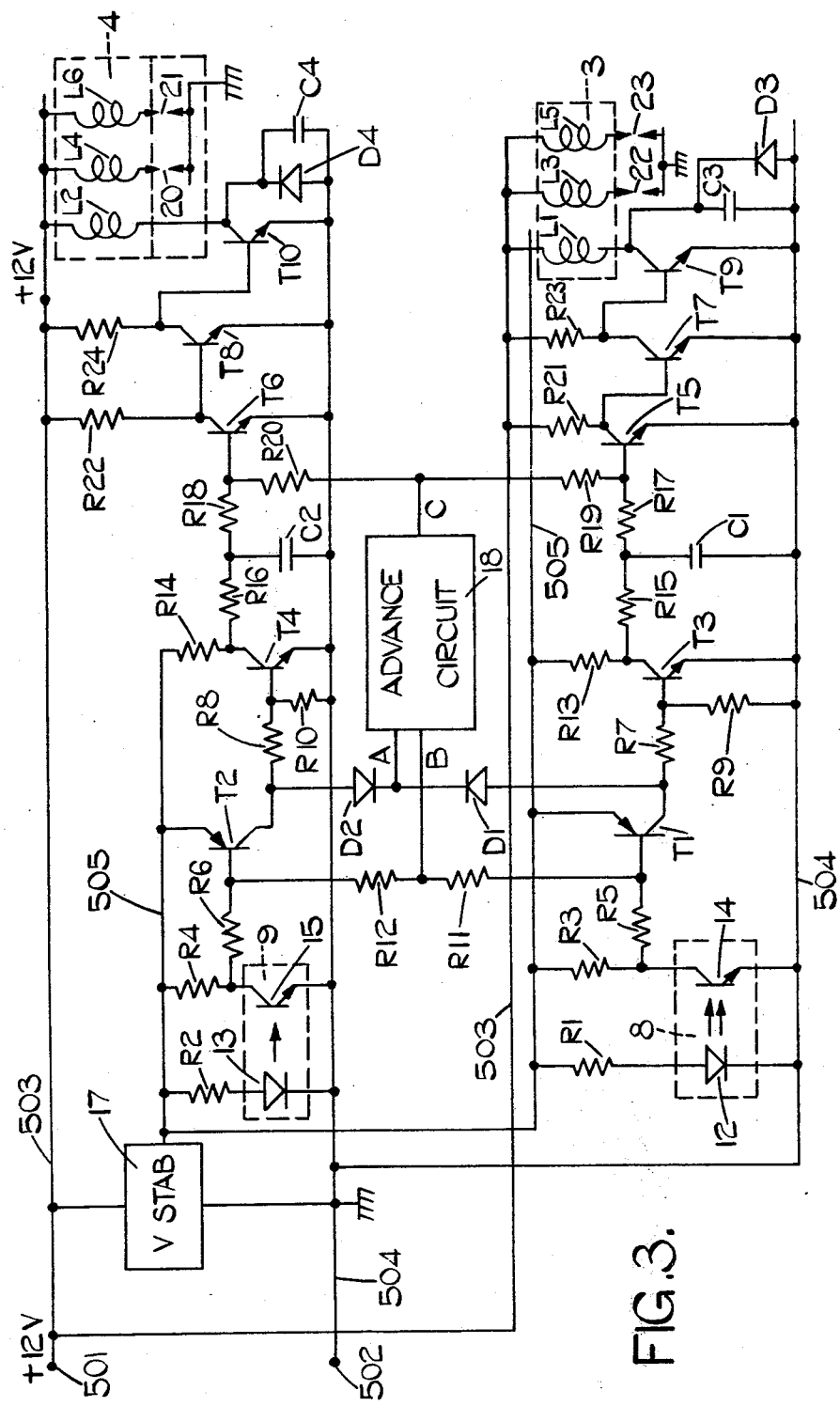
FIG. 3 is a more complete circuit diagram showing the circuit of FIG. 1 in more detail.
Figure 4:
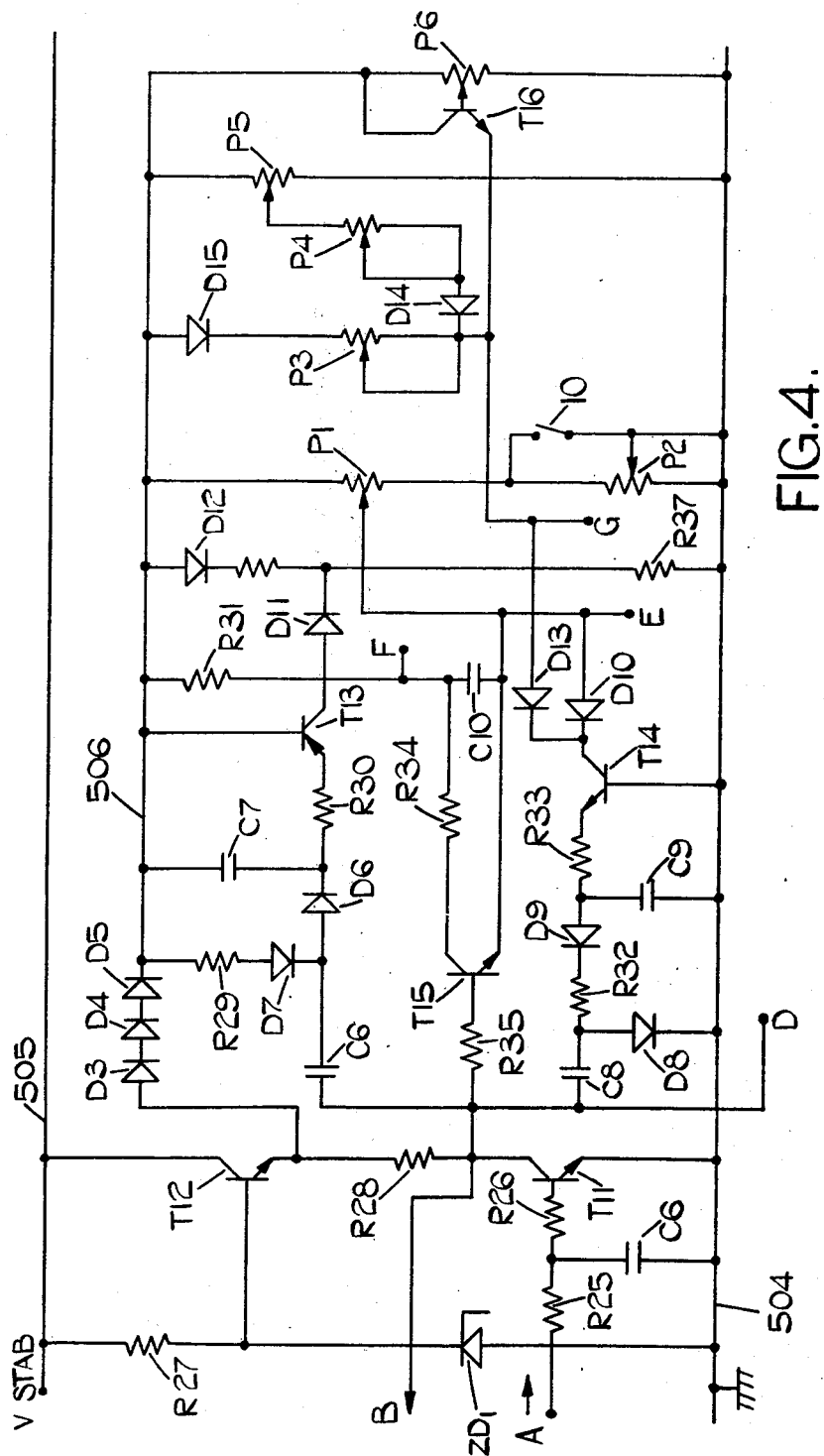
Figure 5:
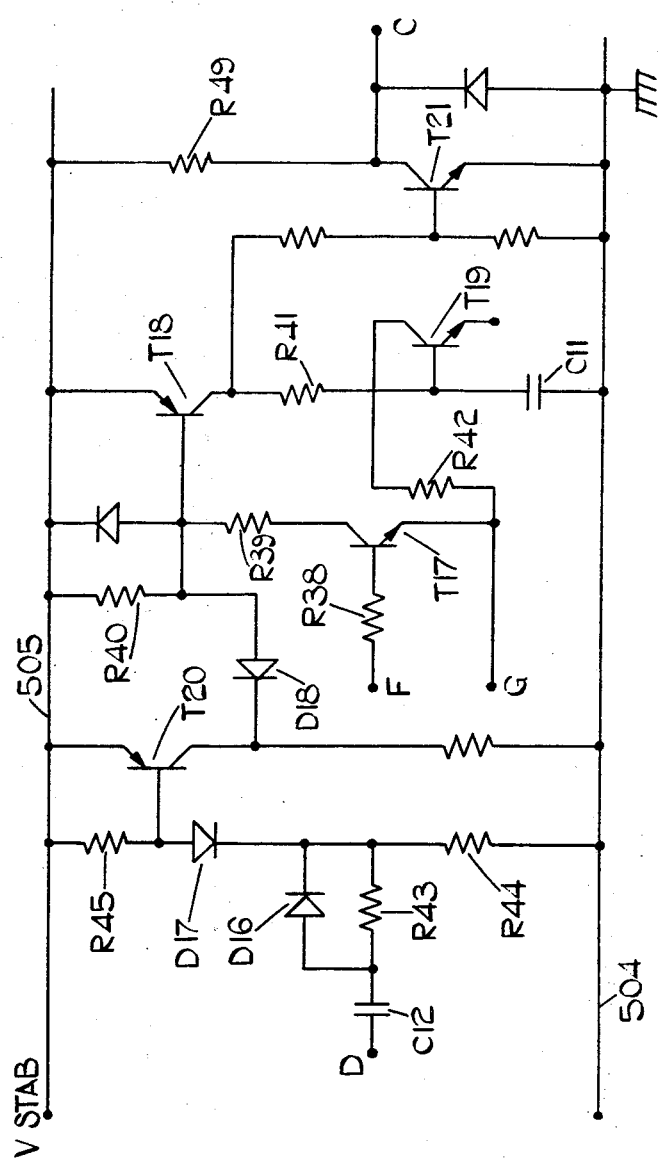
Figure 6:
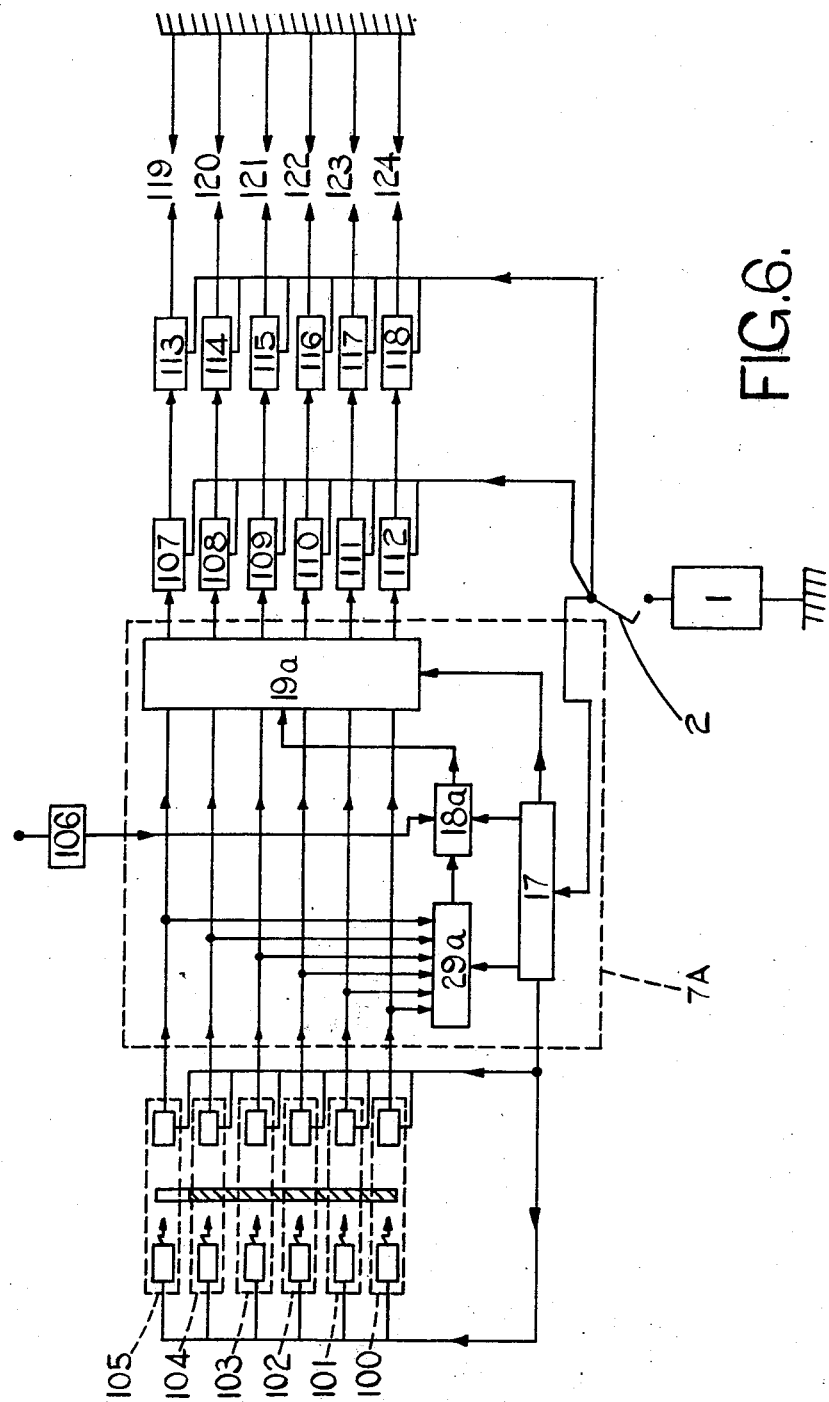
Figures 7, 8:
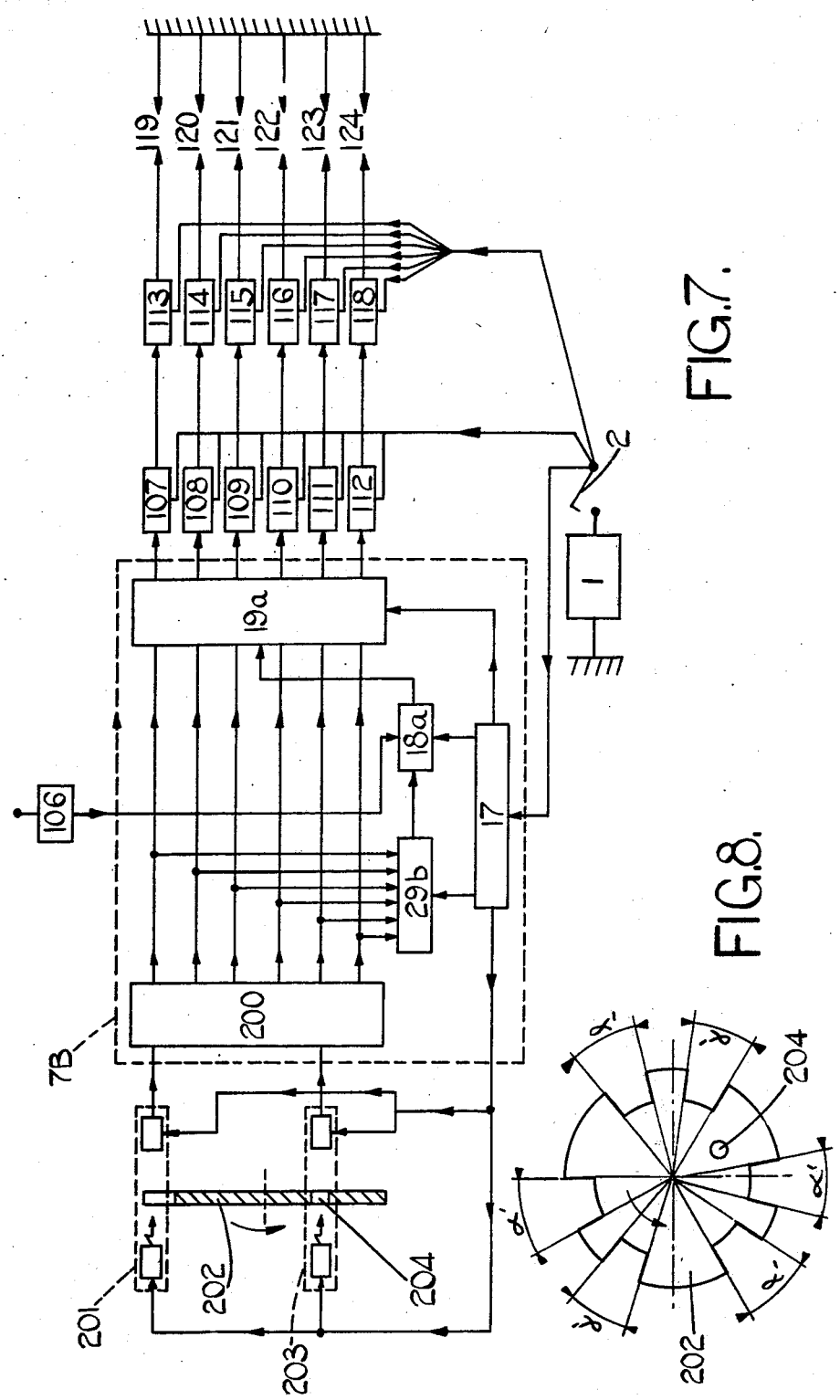
Figures 9, 10:
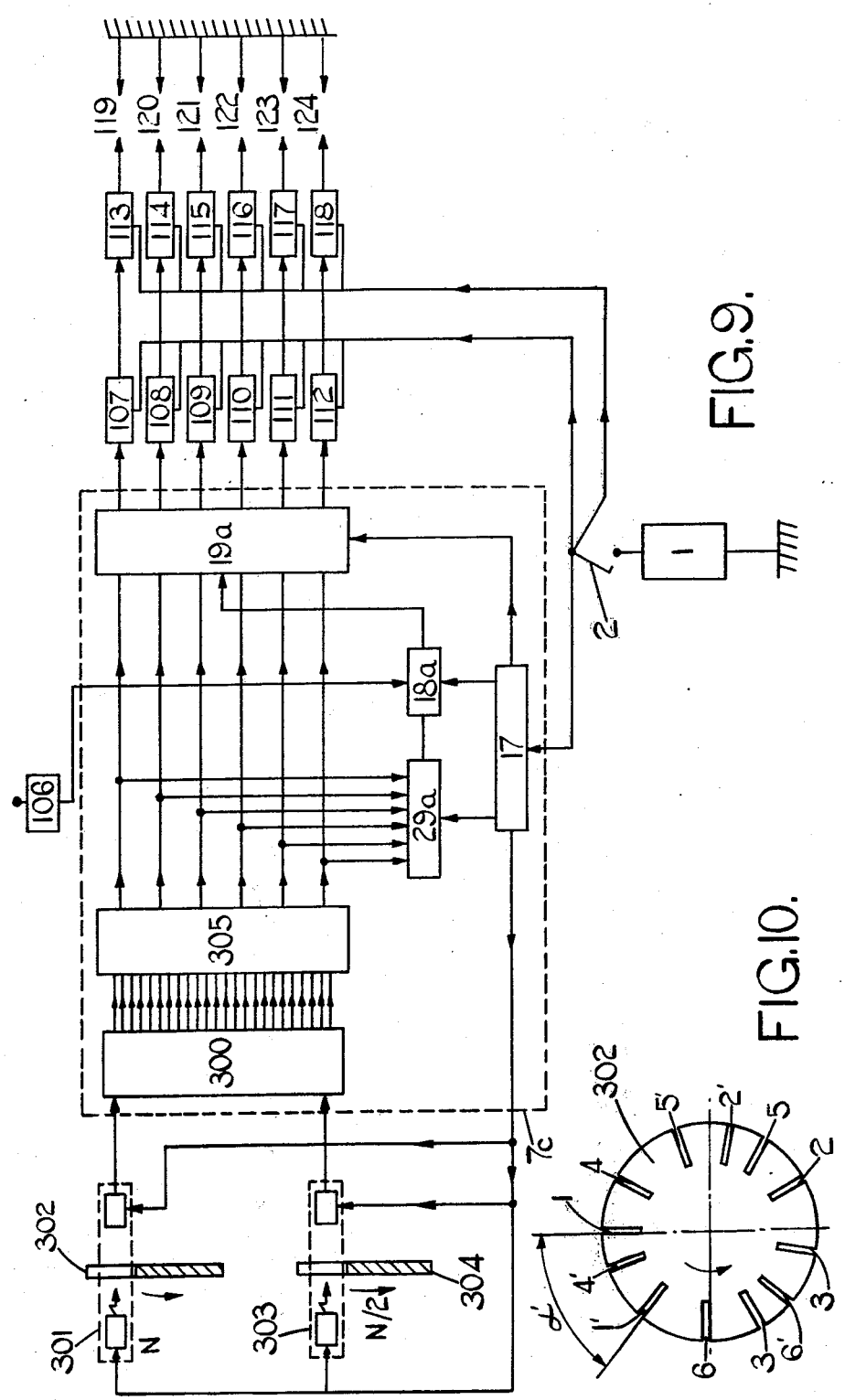

FIGS. 4 and 5 together show the circuit diagram of an ignition advance computer circuit forming a part of the circuit shown in FIG. 3;

FIG. 6 shows schematically a second embodiment of the invention, adapted for use with a four-stroke, multi-cylinder, asymmetrical engine, FIG. 7 shows schematically a third embodiment which is a first variation of the second embodiment, FIG. 8 shows the rotating element associated with the position detectors of the third embodiment shown in FIG. 7, FIG. 9 shows a fourth embodiment of the device which is a second variation of the second embodiment, and FIG. 10 shows the rotating element associated with the embodiment shown schematically in FIG. 9.

By the term "asymmetrical" is meant an engine in which the ignition cycle is irregularly divided, to produce alternately two consecutive sparks separated by a different angle of ignition. In this type of engine, the ignition of one of the cylinders does not correspond to another cylinder in the exhaust state, so much that the inactive spark could cause disturbances in the operation of the engine.

Figure 1:
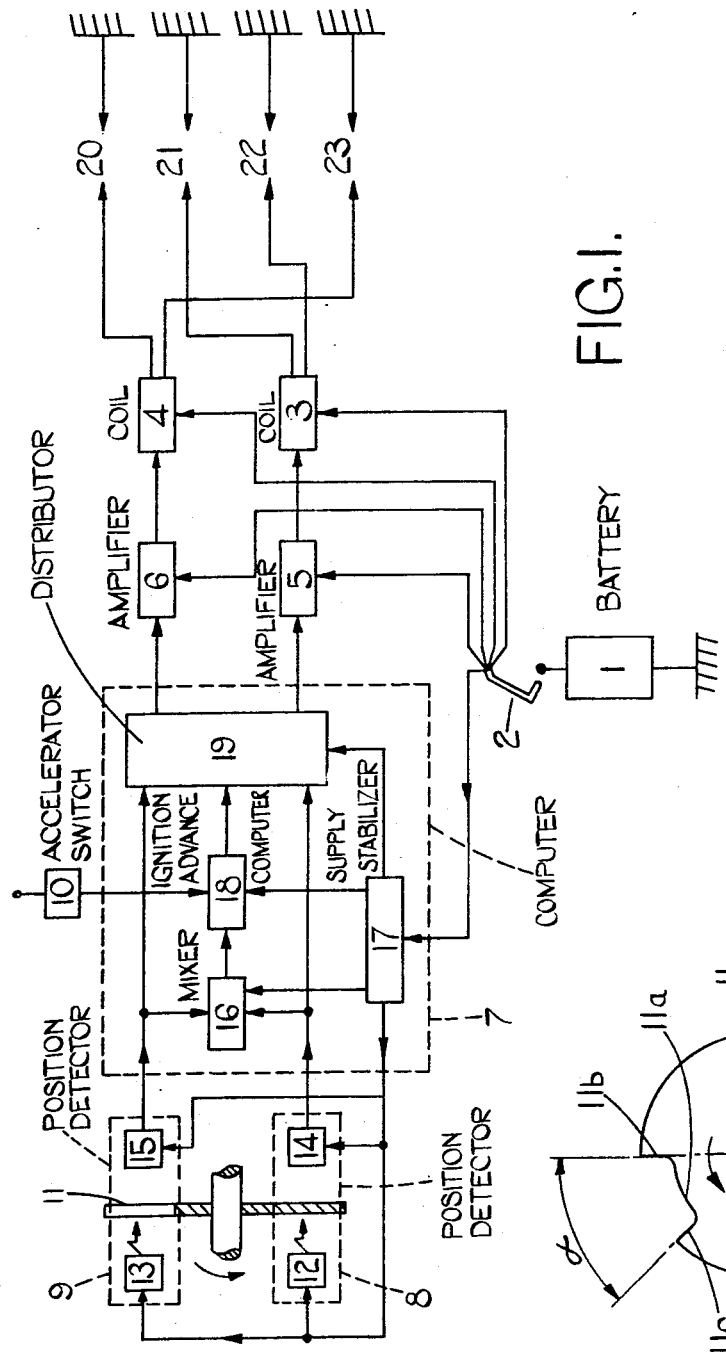
FIG. 1 shows schematically an embodiment in accordance with the invention, adapted for use with a four-stroke, multi-cylinder symmetrical engine.

The embodiment shown in FIG. 1 comprises a battery 1, and a switch 2, through which voltage is supplied to the voltage step-up coils 3 and 4, the amplifying elements 5 and 6 and the computer 7.

The computer 7 receives and treats the signals supplied by the position detectors 8 and 9 and by the sensor 10.

The signals supplied by the position detectors 8 and 9 are of frequency proportional to the speed of rotation of the rotating element 11 (shown in FIG. 2), which element comprises, in this example, a single slot 11a of angular size α, determined as a function of the imposed values of ignition advance. The edge 11b of the slot determines the initial timing point and as a result the occurrence of the ignition spark when, at low rotation speeds, the advance is at its minimum value.

Figure 2:
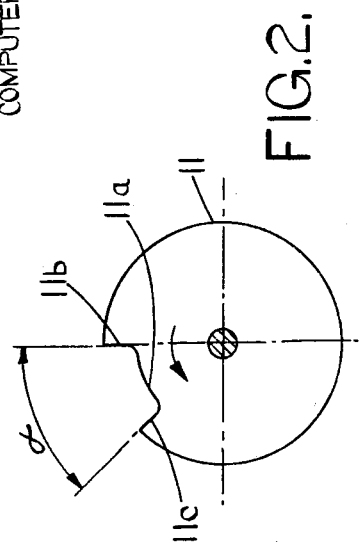
FIG. 2 shows the rotating element associated with the position detectors in the embodiment of FIG. 1.

The edge 11c determines the maximum value of the ignition advance, the rotating element 11 being driven in the direction indicated by the arrow shown in FIG. 2.

The position detectors are constituted by electroluminescent diodes 12 and 13 and by photo-transistors 14 and 15 which conduct upon receiving the radiation from the diodes 12 and 13, the rotating element obscuring the radiation from the said diodes by its unslotted portion.

The sensor 10, which reacts to one of the operational parameters of the engine, is in this example a switch controlled by the accelerator. In this particular case, an electronic ignition distribution and control device is thus created, which ensures a so-called "advance" condition, when the accelerator is in the work position, and a so-called "retard" condition, when the accelerator is in the rest position.

In the example described, position detectors constituted by electroluminescent diodes and by photo-transistors were preferred because of their simplicity of use and their precision. It is clear that these detectors could be of the mechanical, magnetic, fluid, oscillator or Hall effect type, etc., the associated rotating element then having a characteristic suitable to the type of detector used. Similarly, the sensor could be dependent on other operational parameters of the internal combustion engine, such as, for example, the depression prevailing in the inlet mainfold, the temperature of the engine etc.

In all cases, one or more functions, variable or not, will be introduced into the input or inputs, provided to this end, of the advance system, known per se, which is combined with the computer 7.

The computer 7 ensures two functions, firstly the creation of an ignition signal by means of the ignition advance system 18, and secondly the selection of this signal and its direction towards the amplifying element sensitized by the corresponding position detector.

The computer 7 has a mixer 16 which groups the signals supplied by the detectors 8 and 9; one of the inputs of this mixer is connected to one of the outputs of a stabilised supply 17, the other inputs of the mixer 16 being connected respectively to the photo-transistors 14 and 15 of the detectors 8 and 9.

The output of the mixer is connected to one of the three inputs of the ignitiion advance system 18, whilst the two other inputs of the said system are connected respectively to one of the outputs of the stabilised supply 17 and to the output of the sensor 10.

The output of the ignition advance system 18 is connected to one of the inputs of a distributor 19, the other inputs of this separator being connected respectively to the outputs of the photo-transistors 14 and 15 of the detectors 8 and 9.

The distributor 19 directs, by means of the signals coming from the photo-transistors 14 and 15, the ignition signal generated by the ignition advance system 18 to the input of the amplifying element 5 or 6 connected to the battery 1 by the closure of the switch 2. This amplifying element 5 to 6, sensitized by the photo-transistor which is associated with it, supplies the energy necessary to ignite the gaseous mixture, by means of the voltage step-up coils 3 or 4, each including a primary winding, one of the ends of which is connected to the output of the corresponding amplifying element and the other of which is connected to the battery 1 by the closure of the switch 2 and to one of the ends of the two secondary windings connected to the sparking plugs 20 and 23 or 21 and 22.

In this example of ignition of a symmetrical, four-stroke, four cylinder engine, the positiion detectors 8 and 9 are disposed at 180° one to the other and the associated rotating element (shown in FIG. 2) turns without sliding at the speed of rotation of the main shaft of the engine.

Since the voltage of the battery 1 is variable when the internal combustion engine is started, and more particularly at low temperature, it is advantageous, in order not to affect the operation of the ignition device, to provide a stabilised supply to the various elements of the computer and from the position detectors, which supply is incorporated for example, but not necessarily, in the computer.

Turning now to the more complete disclosure of the circuit of FIG. 1 in FIGS. 3 to 5, the battery terminals are shown at 501, 502 in FIG. 3 and are connected to a positive supply rail 503 and an earth rail 504 respectively. The voltage supply stabilizer 17 supplies a rail 505. The two diodes 12, 13 are connected in series with respective resistors $R_1$, $R_2$ between the rails 505 and 504 and the photo-transistors 14, 15 have their emitters grounded to rail 504 and their collectors connected to rail 505 via resistors $R_3$, $R_4$ respectively.

Referring now to the control channel associated with the detector 8 and the transformer 3 (the components of the other channel being identical with even subscripts one higher than the odd subscripts in the following description), the collector of the transistor 14 is connected by a resistor $R_5$ to the base of a transistor p-n-p $T_1$ the emitter of which is connected to the rail 505 and the collector of which is connected by a pair of resistors $R_7$, $R_9$ in series to the rail 504. The collector of the transistor $T_1$ is connected to the anode of a diode $D_1$ with its cathode connected to an input terminal A of the ignition advance computer circuit 18. The latter has (as will be hereinafter described) an input stage constituted by an inverting amplifier which has an output terminal B connected by a resistor $R_{11}$ to the base of the transistor $T_1$, thereby providing positive feedback to give very rapid switching of the transistor $T_1$.

The common point of resistors $R_7$, $R_9$ is connected to the base of an n-p-n transistor $T_3$ the emitter of which is grounded to rail 504 and the collector of which is connected by a resistor $R_{13}$ to the rail 505. A T filter network $R_{15}$, $R_{17}$, $C_1$ connects the collector of the transistor $T_3$ to the base of an n-p-n transistor $T_5$ which forms the distributor stage 19. The base of the transistor $T_5$ is connected by a resistor $R_{19}$, to an output terminal C of the circuit 18. The emitter of the transistor $T_5$ is grounded to the rail 504 and its collector is connected by a resistor $R_{21}$ to the rail 503.

The amplifier 5 is constituted by two p-n-p transistors $T_7$, $T_9$ each having its emitter grounded to the rail 504. The transistor $T_7$ has its base connected to the collector of the transistor $T_5$ and its collector connected via a resistor $R_{23}$ to the rail 503. The base of the transistor $T_9$ is connected via the primary $L_1$ of the transformer 3, the two secondaries of which are connected between the rail 503 and the spark plugs 22, 23 respectively. A capacitor $C_3$ and a diode $D_3$ in parallel are connected between the collector of the transistor $T_9$ and the earth rail 504.

The circuit 18 shown in FIGS. 4 and 5 is common to both channels and includes, as mentioned above, an input stage constituted by an inverting amplifier. This amplifier includes an n-p-n transistor $T_{11}$ with its base connected to input terminal A by a T-filter network $R_{25}$, $R_{26}$, $C_5$. An additional voltage stabilisation stage is included in the circuit 18 and includes an n-p-n transistor $T_{12}$ connected as an emitter follower with its base biased by a resistor $R_{27}$ and a zener diode $ZD_1$ connected in series between the rails 505, 504. The collector of the transistor $T_{11}$ is connected by a resistor $R_{28}$ to the emitter of the transistor $T_{12}$ and is also connected to the output terminal B. Three diodes $D_3$, $D_4$, $D_5$ in series connect the emitter of the transistor $T_{12}$ to a rail 506 and provide temperature compensation for the current sources to be described hereinafter.

The first of these current sources is intended to provide a current proportional to engine speed for integration to provide a voltage dependent on the engine shaft position. This current source includes a diode pump constituted by a capacitor $C_6$ connecting the collector of the transistor $T_{11}$ to the anode of a diode $D_6$ and the cathode of a diode $D_7$ which has its anode connected to the rail 506 via a current limiting resistor $R_{29}$. The cathode of the diode $D_7$ is connected to one side of a capacitor $C_7$ the other side of which is connected to the rail 506. The cathode of the diode $D_7$ is also connected via a resistor $R_{30}$ to the emitter of a p-n-p transistor $T_{13}$ with its base connected to the rail 506 and its collector connected by a high value resistor $R_{31}$ to the rail 506. The basic function of the current source $T_{13}$ is to pass a sufficient current to ensure that said one side of the capacitor $C_7$ remains at a voltage above that on rail 506 an amount determined by the $V_{BE}$ of the transistor $T_{13}$. The route taken by this current at different times will be discussed hereinafter.

The other current source is intended to provide a voltage which varies as a function of engine speed. This second current source includes a diode pump i.e. a capacitor $C_8$, diodes $D_8$, $D_9$ and a resistor $R_{32}$ creating a voltage on the anode of diode $D_9$ below that on the earth rail 504. A capacitor $C_9$ is connected between the anode of the diode $D_9$ and the rail 504 and a resistor $R_{33}$ connects the anode of diode $D_9$ to the emitter of a p-n-p transistor $T_{14}$, with its base grounded to rail 504. The transistor $T_{14}$ conducts sufficient current to hold the voltage on the capacitor $C_9$ at a level determined by the $V_{BE}$ of the transistor $T_{14}$.

The integration of the first current signal is carried out by a capacitor $C_{10}$ connected between the collector of the transistor $T_{13}$ and the variable point of a potentiometer $P_1$ connected in series with a potentiometer $P_2$ between the rails 506 and 504. The potentiometer $P_2$ is bridged by the switch 10 which is closed when the accelerator pedal is raised and open when the pedal is depressed. The collector of the transistor $T_{14}$ is also connected by a diode $D_{10}$ to the variable point of the potentiometer $P_1$. The capacitor $C_{10}$ is bridged by an n-p-n transistor $T_{15}$ in series with a resistor $R_{34}$. A resistor $R_{35}$ connects the base of the transistor $T_{15}$ to the collector of the transistor $T_{11}$ so that transistor $T_{15}$ switches on when transistor $T_{11}$ switches off and vice versa. When transistor $T_{15}$ is switched on the charge on capacitor $C_{10}$ is held at a level dependent on the current through $R_{34}$ and $V_{CE}$ (sat) of the transistor $T_{15}$. This current is determined by the current flowing through the transistor $T_{13}$ to the potentiometer $P_1$. When the transistor $T_{15}$ is switched off the same current flows into the capacitor $C_{10}$ charging it up at a rate directly proportional to engine speed. The maximum voltage on $C_{10}$ is determined by a diode $D_{11}$ connected to the common point of two resistors $R_{36}$, $R_{37}$ connected in series with a diode $D_{12}$ between the rails 505, 504.

The emitter of transistor $T_{14}$ is also connected by a diode $D_{13}$ to a variable resistor $P_3$ connected by a diode $D_{15}$ to the rail 505, yet another diode $D_{14}$ to a variable resistor $P_4$ connected to the variable point of a potentiometer $P_5$ bridging the rails 506, 504. There is also a further potentiometer $P_6$ bridging the rails 506, 504 and having its variable point connected to the base of an n-p-n transistor $T_{16}$. The collector of transistor $T_{16}$ is connected to the rail $T_{16}$ and its emitter connected via the diode $D_{13}$ to the transistor $T_{14}$.

Two voltage signals are taken from two terminals F and G in FIG. 4 to the circuit of FIG. 5 to be described hereinafter. The voltage at terminal F (i.e. the collector of transistor $T_{13}$) is at the level determined by the voltage on the slider of potentiometer $P_1$ (which in turn depends on whether the switch 10 is open or closed) whenever the transistor $T_{15}$ is on and rises in a ramp with a slope determined by engine speed when the transistor $T_{15}$ turns off. The voltage at the terminal G (which is at the anode of the diode $D_{13}$) has a maximum value set by $P_1$, $P_2$ at low engine speed, and falls as engine speed rises, initially at a slope determined by the setting of $P_3$ until $D_{14}$ starts to conduct at a voltage set by $P_5$ and then at a slope determined by $P_4$ until transistor $T_{16}$ starts to conduct whereafter the voltage on terminal G remains constant with increasing speed.

Turning now to FIG. 5 terminals F and G are connected respectively to the base of an n-p-n transistor $T_{17}$ (via a resistor $R_{38}$) and to the emitter of that transistor, which acts as a voltage comparator, turning on when the voltage at F exceeds that at G by the $V_{BE}$ of the transistor $T_{17}$. The collector of the transistor $T_{17}$ is connected via two resistors $R_{39}$, $R_{40}$ in series to the rail 505, the junction of these resistors being connected to the base of a p-n-p transistor $T_{18}$ with its emitter connected to the rail 505. The collector of the transistor $T_{18}$ is connected via a resistor $R_{41}$ and a capacitor $C_{11}$ in series to the rail 504, the junction of the resistor $R_{41}$ and the capacitor $C_{11}$ being connected to the base of an n-p-n transistor $T_{19}$ the emitter of which is connected via a terminal E to the anode of the diode $D_{10}$ in FIG. 4. The collector of the transistor $T_{19}$ is connected by a resistor $R_{42}$ to the emitter of the transistor $T_{17}$. Thus when the transistor $T_{17}$ starts conducting and turns on the transistors $T_{18}$ and $T_{19}$, voltage on the lower plate of the integrating capacitor $C_{10}$ rises, thereby causing regenerative switching action.

The transistor $T_{18}$ may also be turned on through the intermediary of a monostable circuit shown in the left of FIG. 5. This circuit includes a coupling capacitor $C_{12}$ connected via a terminal D to the collector of transistor $T_{11}$ in FIG. 4. The other side of the capacitor $C_{12}$ is connected via a pair of resistors $R_{43}$, $R_{44}$ in series to the rail 504. The resistor $R_{43}$ is bridged by a diode $D_{16}$ which conducts when the voltage on capacitor $C_{12}$ is rising. The junction of resistors $R_{43}$, $R_{44}$ is connected to the cathode of a diode $D_{17}$, the anode of which is connected via a resistor $R_{45}$ to the rail 505. A p-n-p transistor $T_{20}$ has its base connected to the anode of the diode $D_{17}$ and its emitter connected to the rail 505. The collector of the transistor $T_{20}$ is connected to the rail 504 by a resistor $R_{46}$ and also to the cathode of a diode $D_{18}$, the anode of which is connected to the base of the transistor $T_{18}$. Transistor $T_{20}$ is normally conductive, but the voltage on the resistor $R_{46}$ does not affect transistor $T_{18}$ because of the diode $D_{18}$. When the voltage on the capacitor $C_{12}$ is rising, however, transistor $T_{20}$ will be turned off and will turn on transistor $T_{18}$.

The collector of the transistor $T_{18}$ is connected via a potential divider $R_{47}$, $R_{48}$ to the rail 504 the common point of the divider being connected to the base of an n-p-n output transistor $T_{21}$ with its emitter connected to rail 504 and its collector connected by a resistor $R_{49}$ to the rail 505 and also to the output terminal C.

In operation, at very low speed, the voltage at G will be a maximum and that at F will rise only slowly when transistor $T_{15}$ turns off as a result of transistor $T_{11}$ turning on when transistor $T_1$ or $T_2$ is turned on by its associated detector. The transistor $T_{17}$ will not, therefore, turn on before the output from the photo-transistor 14 or 15 ceases and transistor $T_{11}$ turns off again. This will cause the voltage on capacitor $C_{12}$ to rise effecting switching on of transistors $T_{18}$ and $T_{21}$ as mentioned above.

Turning on of the transistor $T_1$ or $T_2$ also causes the associated transistor $T_3$ or $T_4$ to turn on, thereby removing the bias which previously existed to hold the associated transistor $T_5$ or $T_6$ on, this latter transistor now being held on only by the high voltage output from terminal C of the circuit 18. The appropriate transistor $T_5$ or $T_6$ is thereby conditioned for being turned off when the high voltage at C disappears. The other transistor $T_6$ or $T_5$, however, is not so conditioned since its associated transistor $T_4$ or $T_3$ has not been turned on (the feedback via resistor $R_{12}$ or $R_{11}$ being insufficient to turn on the one of the transistors $T_2$ or $T_1$ which has not received a signal from its associated position detector).

While current flows through the transistors $T_5$ or $T_6$, current also flows through the primary of the associated transformer 3 or 4 so that energy is stored in its core. When the output at C goes low this current is interrupted and a spark is produced at each associated spark plug.

As engine speed increases, the voltage at G falls in accordance with the law set by the potentiometer $P_1$ to $P_6$ and the rate of increase in the voltage at F increases until the point is reached where $T_{17}$ is turned on before the monostable circuit around $T_{20}$ is triggered. Advance of the spark timing thus commences and continues in accordance with the law mentioned.

The second embodiment shown schematcially in FIG. 6, relates to the ignition of a four stroke, multi-cylinder, asymmetrical engine. In this embodiment, the computer 7A receives and treats the signals supplied by position detectors 100, 101, 102, 103, 104 and 105, each constituted by an electroluminescent diode and a photo-transistor operating as described in the first embodiment, the associated rotating element shown in FIG. 2 turning at half the speed of rotation of the main shaft of the internal combustion engine.

The position detectors 100, 101, 102, 103, 104 and 105 are disposed on a circle and angularly spaced between themselves alternately at 75° and 45°, and $\alpha$ is the angular size of the slot in the rotating disc 11 (FIG. 2), the value of $\alpha$ being a function of the value of the ignition advance imposed. The sensor 106 may be of the same type as that described in the preceding embodiment, or dependent on one of the operational parameters of the internal combustion engine.

The computer 7A includes a mixer 29a one of the inputs of which is connected to one of the outputs of the stabilised supply 17, whilst its other inputs are connected respectively to the outputs of the position detectors 100, 101, 102, 103, 104 and 105. The output of the mixer is connected to one of the inputs of the ignition advance system 18a, the other inputs of the said system being connected to one of the outputs of the stabilised supply 17 and to the output of the sensor 106.

The output of the advance system 18a is connected to one of the inputs of the separator 19a, the other inputs of this separator being connected respectively to the outputs of the positions detectors 100, 101, 102, 103, 104 and 105.

The separator 19a directs, by means of the signals supplied by the photo-transistors of the position detectors 100, 101, 102, 103, 104 and 105, the ignition signal generated by the ignition advance system 18a, towards the imput of one of the amplifying elements 107, 108, 109, 110, 111 and 112, which amplifying element, sensitized by the photo-transistor which is associated with it, supplies the energy necessary to ignite the gaseous mixture, by means of one of the voltage step-up coils 113, 114 115, 116, 117 and 118, connected respectively to the sparking plugs 119, 120, 121, 122, 123 and 124.

The embodiment shown sechematically in FIG. 7 is a first variation of the second embodiment, in which variation a counter 200 is incorporated in a computer 7B, which counter receives the signals from a first position detector 201, constituted by an electroluminescent diode and by a photo-transistor, associated with a rotating element 202 (shown in FIGS. 4 and 5) turning at half the speed of the main shaft of the internal combustion engine. The counter also receives the signals from a second position detector 203, constituted by an electroluminescent diode and by a photo-transistor which, by means of an opening 204, restarts the counting cycle at each turn of the rotating element 202.

The counter 200 has a number of outputs equal to the number of combustion chambers of the internal combustion engine. The outputs of the counter are connected to the corresponding inputs of a mixer 29b and to the corresponding inputs of the separator 19a.

The mixer 29b which groups the signals supplied by the counter 200 is connected to the stabilized supply 17 and to the ignition advance system 18a, itself connected to the sensor 106 and to the separator 19a.

The separator 19a, sensitized by the signals supplied by the counter 200, directs the ignition signal, generated by the ignition advance system 18a, towards the input of one of the amplifying elements 107, 108, 109, 110, 111, and 112, which amplifying element, sensitized by the corresponding output of the counter 200, supplies the energy necessary for ignition, by means of one of the voltage step-up coils 113, 114, 115, 116, 117 and 118, connected respectively to the sparking plugs 119, 120, 121, 122, 123 and 124.

The rotating element 202, shown in FIG. 8, has slots of angular size $a_1$, asymmetrically angularly spaced by the same amount as the position detectors 100 to 105 in the second embodiment previously described and shown in FIG. 6.

The embodiment shown schematically in FIG. 9 is a second variation of the second embodiment shown in FIG. 6, in which variation a counter 300 is incorporated in the computer 7C, which counter receives the signals from a first position detector 301, constituted by an electroluminescent diode and by a photo-transistor, associated with a rotating element 302 (shown in FIGS. 9 and 10) turning at the speed of the main shaft of the internal combustion engine. The counter also receives the signals from a second position detector 303, constituted by an electroluminescent diode and by a photo-transistor, associated with a rotating element 304 (FIG. 9) having a single slot or opening, turning at half the speed of the main shaft, these latter signals restarting the counting cycle at each turn of the rotating element 304.

In this embodiment, adapted for use with a four stroke, six cylinder asymmetrical engine, the rotating element 302 must synchronize the intital timing point of each cylinder and the point of imposed maximum advance; the element 302 will then have 12 slots.

Since the ignition cycle is repeated every second revolution, the 12 slots will be counted twice and the synchronizing of each slot is carried out by a counter provided with 24 outputs.

In FIG. 10, the slots numbered from 1 to 6 correspond to the initial timing point, the slots numbered from 1' to 6' correspond to the point of maximum advance.

After counting, the signals appearing at the different outputs are combined in a converter 305, by means of devices known per se, such as bistable flip-flops for example, in order to generate signals equal in number to the number of cylinders in the engine, which signals, identical to those obtained in the embodiments previously described, are directed towards the mixer 29a and the separator 19a, in order to set off the ignition spark, by means of elements identical to those already mentioned in the previous embodiments.

It is, however, necessary in this particular embodiment to provide a delaying device such as a delaying relay or a monostable flip-flop, so as to avoid a disorder in the ignition cycle, when the engine is being started the ignition cycle not being established before the first passage of the signal to return the counter to zero.

This delaying will be adapted in such a way that it ensures all the ignitions at the minimum speed of rotation of the engine, and will be restarted, every second turn of the engine, by the return to zero signal.

The operation, in accordance with the embodiments previously described, is as follows:

The detectors, each constituted by an electroluminescent diode and by a photo-transistor, detect two limit points corresponding to the edges of the slots in the associated rotating element. One of the edges corresponds to the initial timing point, the other to the reference point, and are arranged in such a way as to fix the limits within which the ignition must occur. In the variation shown in FIG. 9, the rotating element is provided with 12 slots, generating impulses by means of the detectors, which are counted by means of a counter. The return to zero of the counter is carried out by means of an opening formed either in the single rotating element associated with the detectors, or in the second rotating element turning at half the speed of the first rotating element.

The signals supplied directly by the photo-transistors or by the counter are regrouped, by means of a convertor for example in the mixer and they are directed towards the ignition advance system. This system generates an ignition signal as a function of the angular position of the main shaft and of at least one of the operational parameters of the internal combustion engine, which ignition signal is directed, by means of the separator, towards the amplifying element, sensitized by the detector or the corresponding output of the counter; this amplifying element supplies the energy surge necessary for ignition. By means of the voltage step-up coil, this energy causes a spark between the electrodes of the plug.

It will easily be seen that such an electronic ignition distribution and control device offers wide possibilities of application to multi-cylinder symmetrical or asymmetrical engines or to rotating piston engines.

I claim:

1. An internal combustion engine having an electronic ignition distribution and control system, said system comprising detector means including a part rotatable by the engine and directly detecting fixed limit positions between which ignition must take place for each cylinder of the engine, said detector means generating respectively first and second output signals at said limit positions, a computer including an ignition advance system connected to said detector means to trigger said ignition advance system into operation whenever the first output signal is produced, said ignition advance system including delay determining means sensitive to at least one engine operating parameter to determine delay between triggering of said advance system and production of a spark producing output signal thereby, said advance system also including means for producing a spark producing signal independently of said delay determining means whenever the second output signal occurs before termination of the delay, at least one amplifier connected to said computer for amplifying the spark producing signal, a voltage step-up coil means having a primary connected to said amplifier and a secondary connected to at least one spark plug for producing a spark at said spark plug either after a delay determined by said at least one engine operating parameter following production of the first output signal, or upon production of the second output signal, whichever occurs first.

2. An engine having an ignition distribution and control system according to claim 1, having a plurality of amplifiers and detectors and wherein said computer includes a mixer connected to all of said detectors, and connected to said ignition advance system to supply signals thereto from each said detector, said delay determining means operating to determine the delay as a function of speed of rotation of the engine and of at least one other operational parameter of the engine as determined by sensors, sensor means and separator means coupled to said sensor means and to said computer and also connected to said amplifiers for determining which amplifier shall react to the spark producing signal.

3. An engine having a main shaft and an ignition distribution and control system according to claim 1, which includes a rotation detector and a rotating element associated therewith and wherein said computer includes a counter connected to receive output signals from said detector means for detecting limit positions and also signals supplied by said rotation detector, the latter signals restarting the counting cycle of said counter at each turn of said rotating element associated with said rotation detector and turning at half the speed of said main shaft of the engine, a mixer which groups the signals supplied by said counter, said ignition advance system being connected to said mixer and said delay determining means determining said delay as a function of the speed of rotation of the engine and of at least one other operational parameter of the engine, and a separator connected to said counter and to said ignition advance system to determine to which of said amplifiers the spark producing signal is applied.

4. A multi-cylinder engine having a main shaft and an ignition distribution and control system according to claim 1, wherein said computer includes a counter, having a number of outputs which is a multiple of the number of clyinders of the engine, a limit position detector, said counter receiving the signals supplied by said limit position detector, a rotating element turning at the speed of said main shaft of the engine associated with said limited position detector, said computer also receiving signals supplied by said rotation detector associated with said rotating element turning at half the speed of said main shaft, the latter signals restarting the counting cycle of said counter at each turn of said rotating element which turns at half-speed, a converter which reduces the multiple number of signals supplied by said counter to a number of signals equal to the number of combustion chambers, a mixer which groups the signals supplied by said converter, sensor means, an ignition advance system which, receiving the signals supplied by said mixer and a signal supplied by at least one sensor reacting to at least one of the operational parameters of the engine, supplies the ignition signal as a function of the speed of rotation of the engine and of at least one of the operational parameters of said engine, and a separator which directs the ignition signal supplied by said advance system towards said amplifier, which latter supplies the energy necessary for ignition to the voltage step-up coil.

* * * * *